(12) United States Patent
Agiwal et al.

(10) Patent No.: US 10,827,418 B2
(45) Date of Patent: Nov. 3, 2020

(54) APPARATUS AND METHOD FOR TRANSMITTING DEVICE TO DEVICE DISCOVERY MESSAGE IN COMMUNICATION SYSTEM SUPPORTING DEVICE TO DEVICE SCHEME

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/560,406

(22) PCT Filed: Mar. 23, 2016

(86) PCT No.: PCT/KR2016/002918
§ 371 (c)(1),
(2) Date: Sep. 21, 2017

(87) PCT Pub. No.: WO2016/153266
PCT Pub. Date: Sep. 29, 2016

(65) Prior Publication Data
US 2018/0206180 A1  Jul. 19, 2018

(30) Foreign Application Priority Data

Mar. 25, 2015 (IN) .......................... 1540/CHE/2015
Feb. 19, 2016 (KR) ...................... 10-2016-0019674

(51) Int. Cl.
*H04W 48/16* (2009.01)
*H04W 36/26* (2009.01)
(Continued)

(52) U.S. Cl.
CPC ........... *H04W 48/16* (2013.01); *H04W 8/005* (2013.01); *H04W 36/26* (2013.01); *H04W 48/10* (2013.01);
(Continued)

(58) Field of Classification Search
CPC ..... H04W 48/16; H04W 36/26; H04W 76/14; H04W 48/10; H04W 8/005; H04W 48/20
See application file for complete search history.

(56) References Cited

U.S. PATENT DOCUMENTS

2013/0109301 A1   5/2013   Hakola et al.
2013/0324114 A1  12/2013   Raghothaman et al.
(Continued)

FOREIGN PATENT DOCUMENTS

WO      2015-024505 A1    2/2015

OTHER PUBLICATIONS

R3-140266, 3GPP TSG RAN WG3 Meeting #83, Jan. 31, 2014.
(Continued)

*Primary Examiner* — Yemane Mesfin
*Assistant Examiner* — Henry Baron
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE).
A method for transmitting a discovery message in a communication system is provided. The method includes detecting a need for transmitting a discovery message in a serving cell in which a direct discovery process is unsupportable; detecting a cell other than the serving cell; and transmitting the discovery message based on system information if the system information is broadcasted in the cell.

12 Claims, 6 Drawing Sheets

(51) Int. Cl.
*H04W 48/20* (2009.01)
*H04W 48/10* (2009.01)
*H04W 8/00* (2009.01)
*H04W 76/14* (2018.01)
*H04W 48/12* (2009.01)

(52) U.S. Cl.
CPC ............ *H04W 76/14* (2018.02); *H04W 48/12* (2013.01); *H04W 48/20* (2013.01)

(56) References Cited

U.S. PATENT DOCUMENTS

| | | |
|---|---|---|
| 2015/0003287 A1 | 1/2015 | Kalhan et al. |
| 2016/0302250 A1* | 10/2016 | Sheng ..................... H04W 4/70 |
| 2017/0013640 A1* | 1/2017 | Loehr ................... H04W 76/14 |
| 2017/0034751 A1* | 2/2017 | Fujishiro ........... H04W 36/0083 |
| 2018/0132297 A1* | 5/2018 | Li ........................ H04W 72/04 |

OTHER PUBLICATIONS

R1-140135, 3GPP TSG RAN WG1 Meeting #76, Feb. 1, 2014.
Indian Office Action dated Jul. 30, 2020, issued in Indian Patent Application No. 201624010091.

* cited by examiner

[Fig. 1]
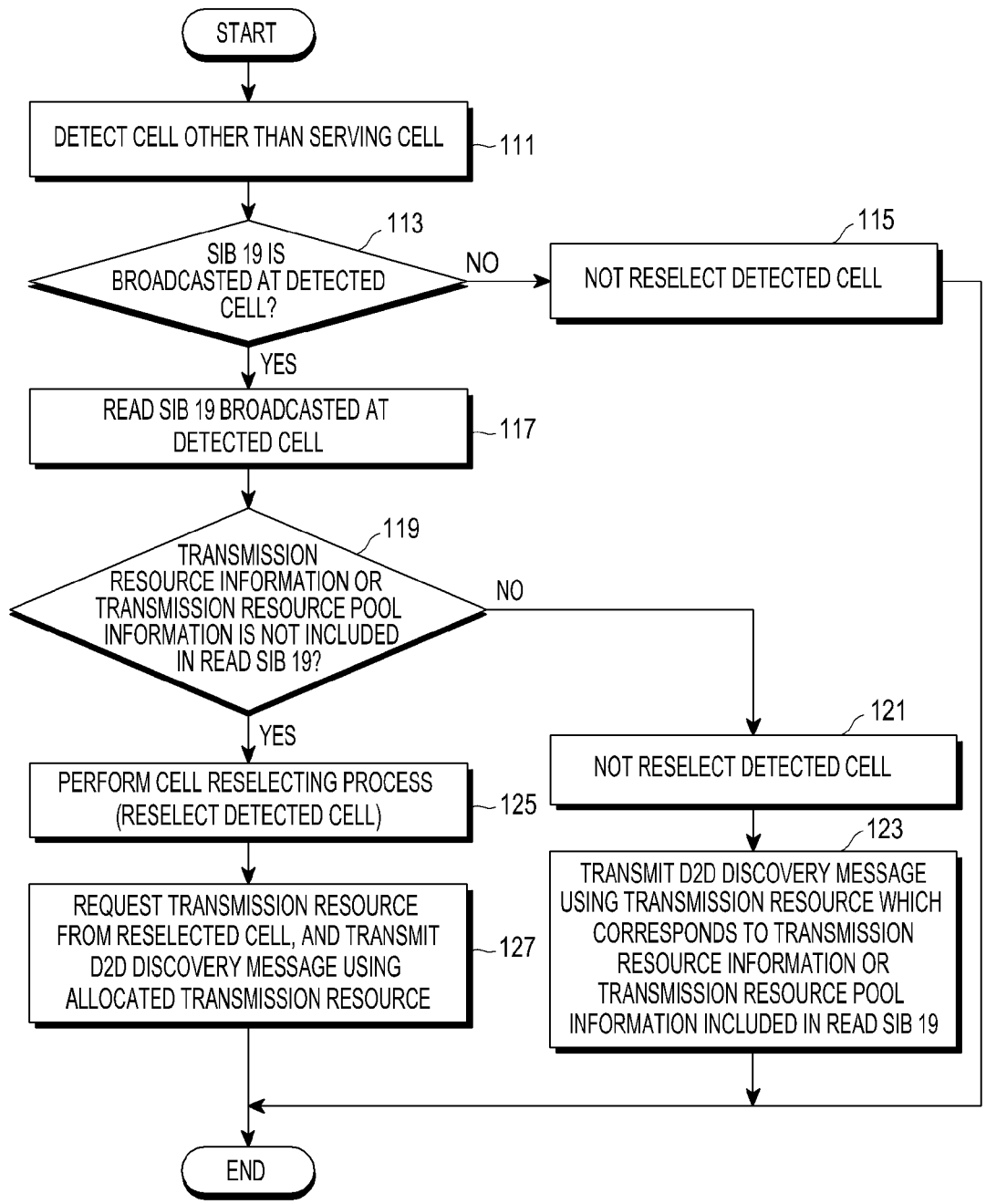

[Fig. 2]
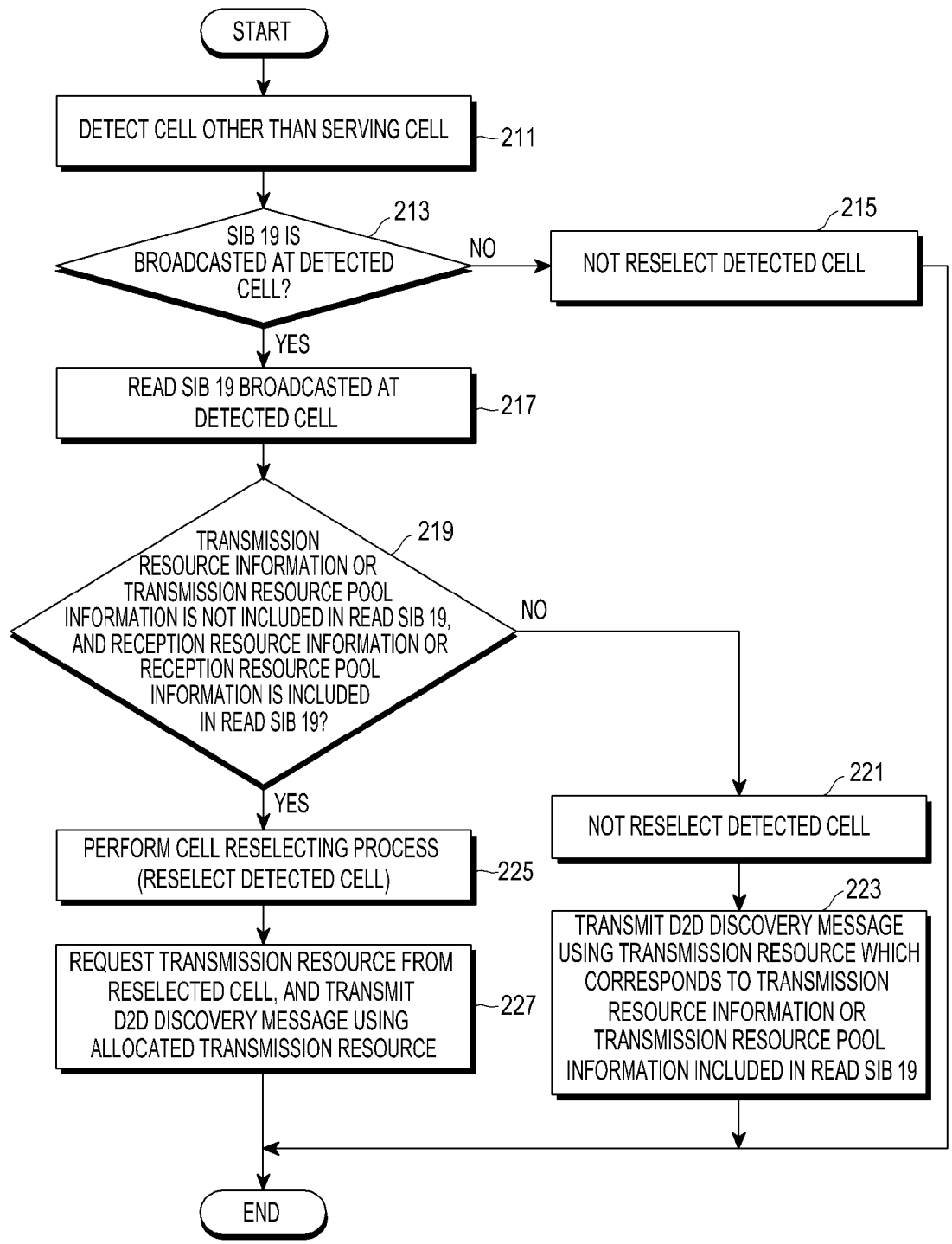

[Fig. 3]
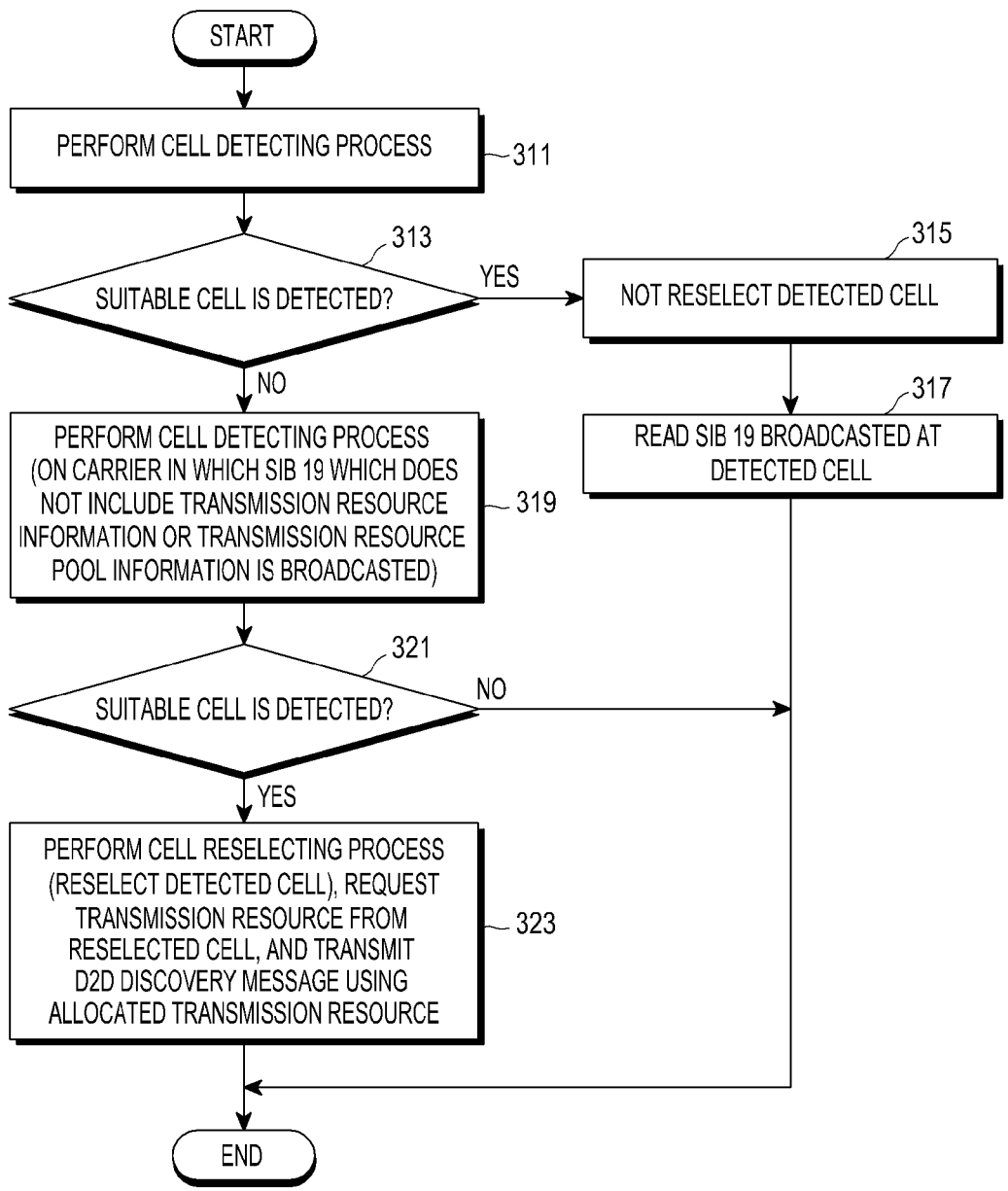

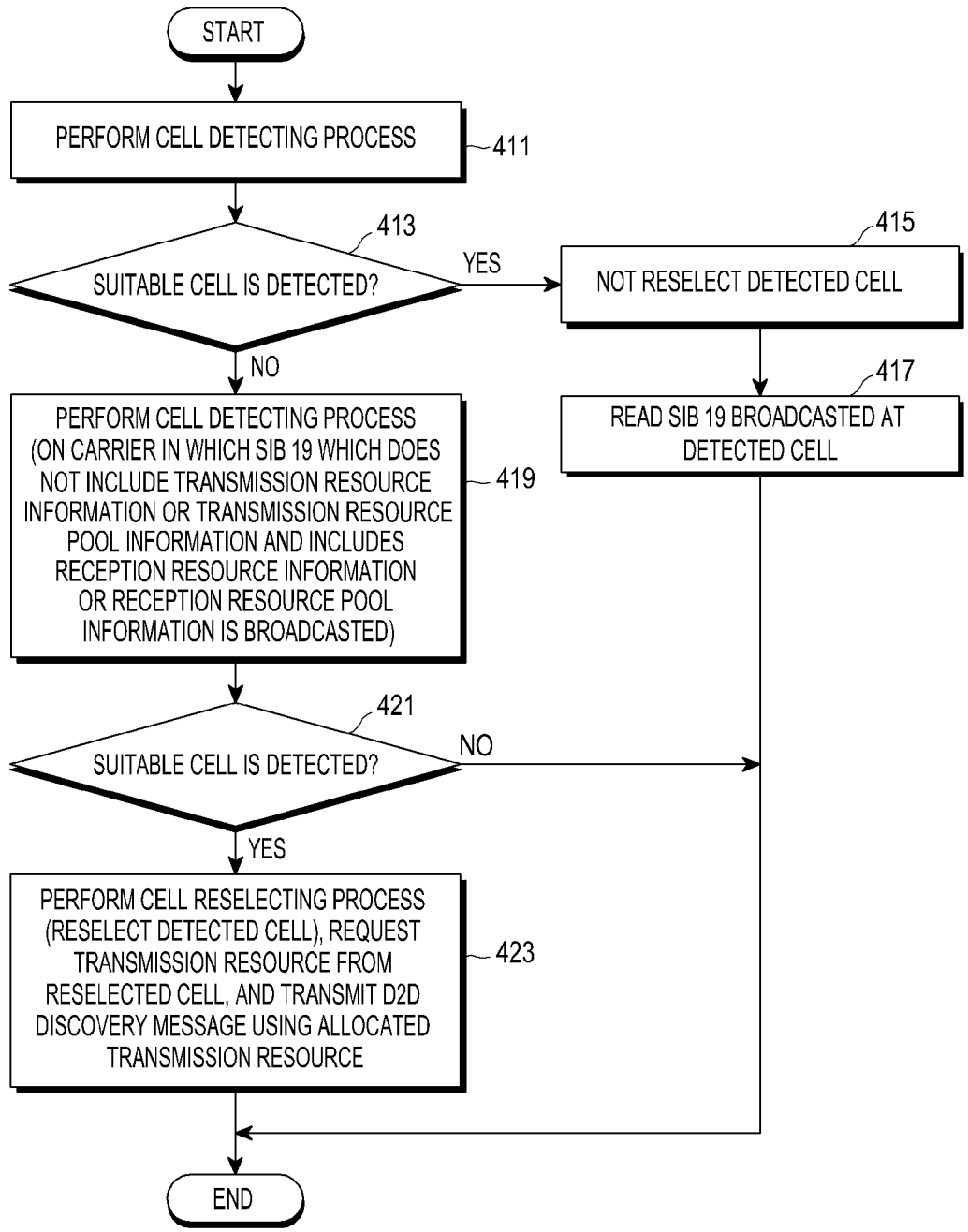
[Fig. 4]

[Fig. 5]
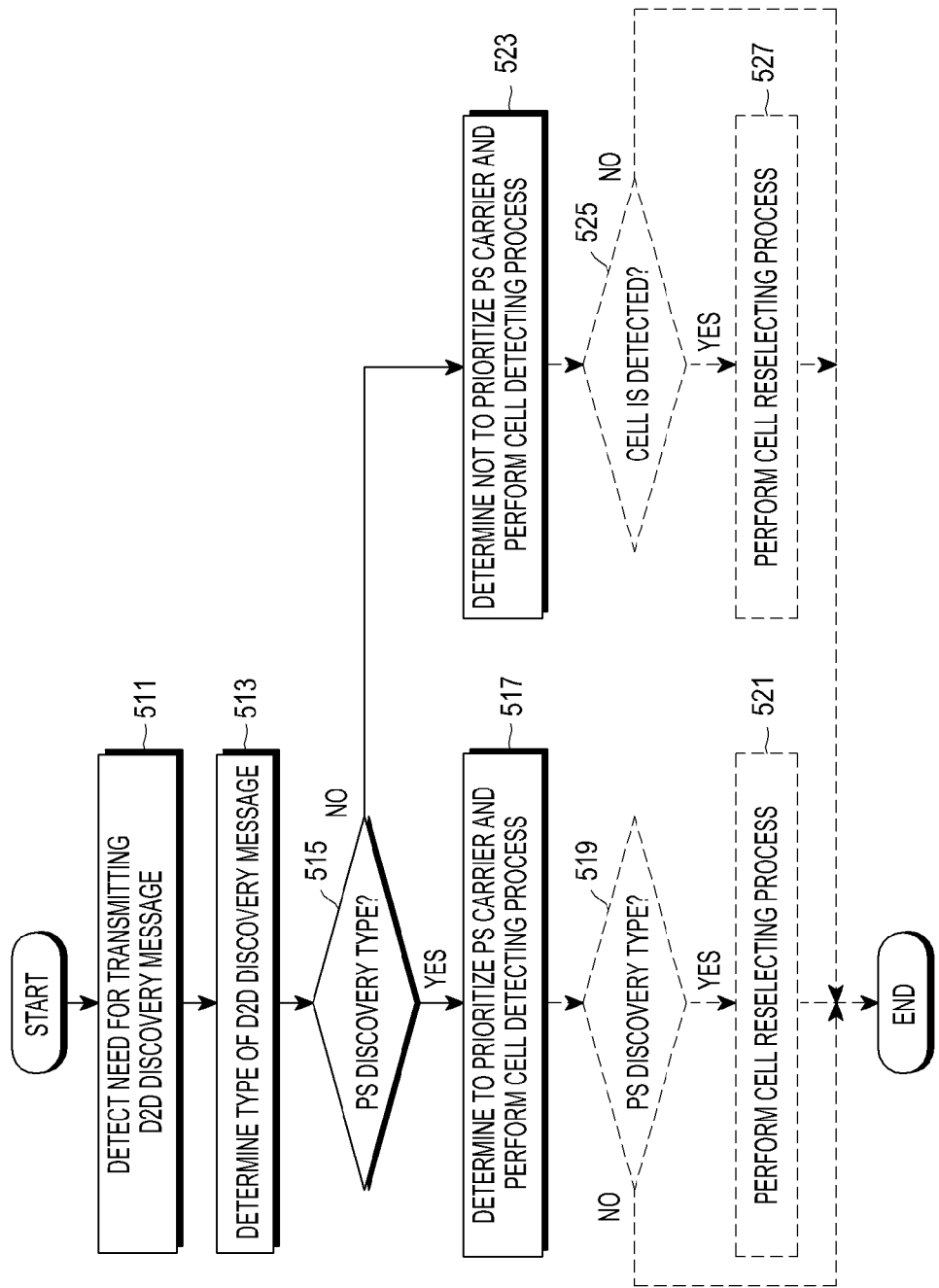

[Fig. 6]
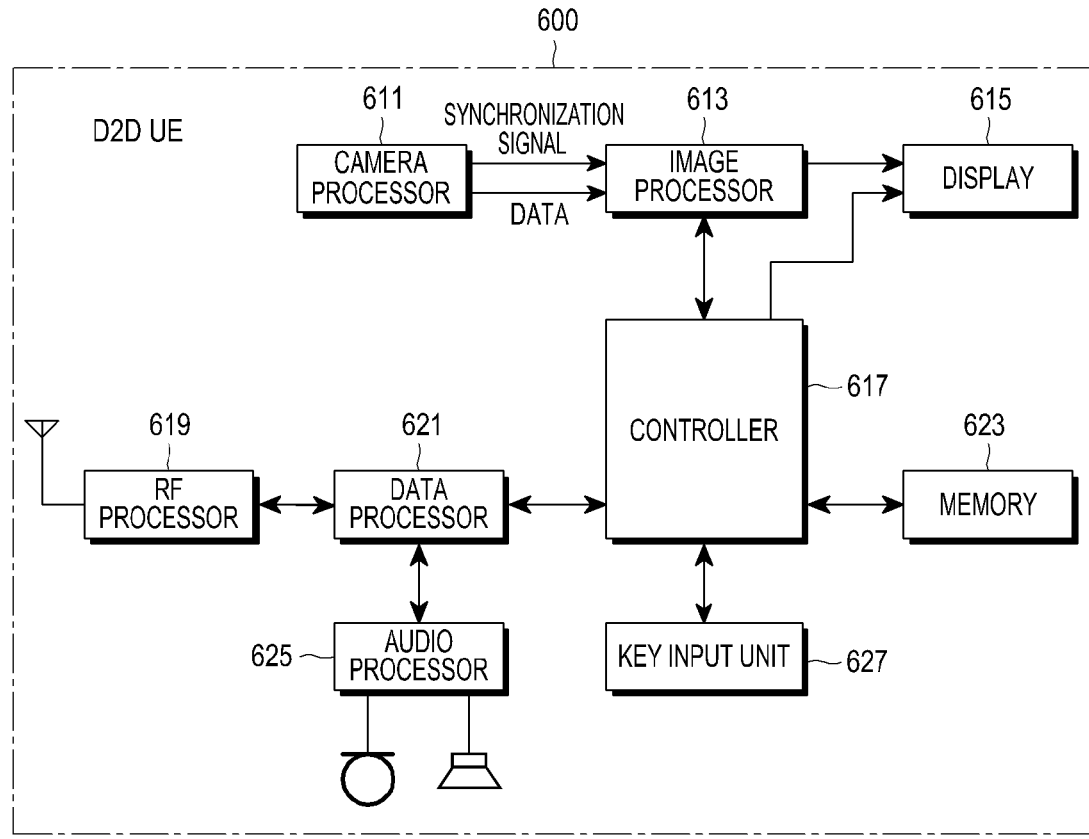
[Fig. 7]
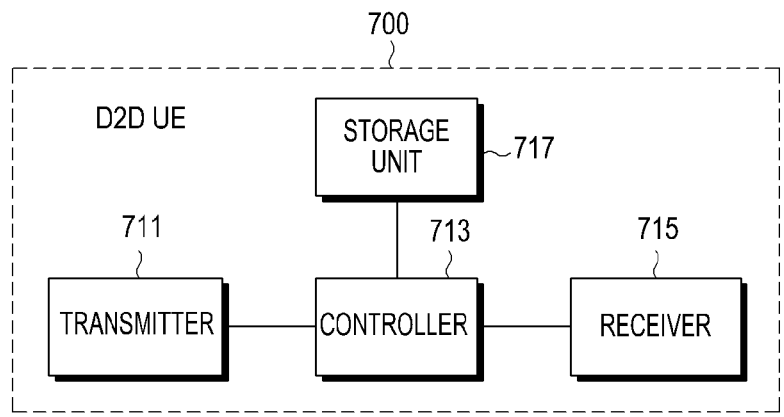

APPARATUS AND METHOD FOR TRANSMITTING DEVICE TO DEVICE DISCOVERY MESSAGE IN COMMUNICATION SYSTEM SUPPORTING DEVICE TO DEVICE SCHEME

CROSS-REFERENCE TO RELATED APPLICATION(S)

This application is a U.S. National Stage application under 35 U.S.C. § 371 of an International application filed on Mar. 23, 2016 and assigned application number PCT/KR2016/002918, which claimed the benefit of a Indian patent application filed on Mar. 23, 2015 in the Indian Intellectual Property Office and assigned Serial number IN 1540/CHE/2015, and claimed the benefit of a Korean patent application filed on Feb. 19, 2016 in the Korean Intellectual Property Office and assigned Serial number 10-2016-0019674, the entire disclosure of which is hereby incorporated by reference.

TECHNICAL FIELD

The present disclosure relates to an apparatus and method for transmitting a message in a communication system supporting a device to device (D2D) scheme, and more particularly, to an apparatus and method for transmitting a D2D discovery message in a communication system supporting a D2D scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

D2D communication is being studied in communication standard groups to enable a D2D discovery service and a D2D data communication service between user equipments (UEs).

A D2D discovery process is a process for determining whether that a D2D-enabled UE is in proximity of another D2D-enabled UE. A discovering D2D-enabled UE determines whether another D2D-enabled UE is interested in the discovering D2D-enabled UE based on the D2D discovery process. The another D2D-enabled UE is interested in the discovering D2D-enabled UE if proximity of the another D2D-enabled UE needs to be known by one or more authorized applications for the discovering D2D-enabled UE. For example, a social networking application can be enabled to use D2D discovery feature. The D2D discovery process enables a D2D-enabled UE of a given user of the social networking application to discovery D2D-enabled UEs of friends of the given user of the social networking application and/or be discovered by the D2D-enabled UEs of the friends of the given user of the social networking application. In another example, the D2D discovery process may enable a D2D-enabled UE of a given user of a search application to discover stores, restaurants, and/or the like which are interested in proximity of the D2D-enabled UE. For example, the D2D-enabled UE discovers other D2D-enabled UEs in proximity of the D2D-enabled UE using direct UE-to-UE signaling.

In a general D2D scheme, if a D2D discovery process is supported in a camped cell, or a serving cell, a D2D UE acquires resources for transmitting a D2D discovery message from the serving cell in order to transmit the D2D discovery message. A D2D UE denotes a UE which supports a D2D scheme.

The serving cell broadcasts discovery resource configuration information through a system information block 19 (SIB19). The SIB 19 may broadcast information on a resource pool for transmission, i.e., a transmission resource pool.

The D2D UE uses resources included in the transmission resource pool for transmitting a D2D discovery message in an idle state. If there is no resource pool for transmission, or the D2D UE is in a connected state, the D2D UE need to request resources from the serving cell using dedicated signaling.

Further, in a general D2D scheme, if a D2D discovery process is not supported in a camped cell, or a serving cell, a D2D UE detects a cell which supports a D2D discovery process on frequencies other than a frequency which is supported by the serving cell.

If the cell which supports the D2D discovery process on the frequencies other than the frequency which is supported by the serving cell is detected, the D2D UE reads an SIB 19 broadcasted in the detected cell and uses transmission resources indicated by transmission resource allocation information which is broadcasted in the SIB 19 for transmitting the D2D discovery message. The D2D UE does not reselect the detected cell and performs a transmitting operation at the detected cell while the D2D UE is camped on a current cell. One of the limitations of this scheme is that a D2D UE may not transmit a D2D discovery message if the SIB 19 broadcasts transmission resource allocation information at the detected cell.

In a general D2D scheme, if a D2D discovery process is not supported on a camped cell or a serving cell, a D2D UE detects cells which support a D2D discovery process on frequencies other than a frequency which is used in the serving cell.

If the cell which supports the D2D discovery process on the frequencies other than the frequency which is supported by the serving cell is detected, the D2D UE reselects the detected cell. The detected cell becomes a new serving cell of the D2D UE. One of the limitations of this scheme is that all D2D UEs will move to a cell which uses a frequency which support a D2D discovery process. This will lead to load imbalance in a system.

So, there is a need for an enhanced method for reselecting a cell in a case that a serving cell does not support a D2D discovery process.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to propose an apparatus and method for transmitting a D2D discovery message in a communication system supporting a D2D scheme.

Another aspect of the present disclosure is to propose an apparatus and method for transmitting a D2D discovery message based on system information in a communication system supporting a D2D scheme.

Another aspect of the present disclosure is to propose an apparatus and method for transmitting a D2D discovery message in a serving cell which does not support a D2D discovery process in a communication system supporting a D2D scheme.

Another aspect of the present disclosure is to propose an apparatus and method for transmitting a D2D discovery message based on system information in a serving cell which does not support a D2D discovery process in a communication system supporting a D2D scheme.

Another aspect of the present disclosure is to propose an apparatus and method for transmitting a D2D discovery message by performing a cell reselecting process in a serving cell which does not support a D2D discovery process in a communication system supporting a D2D scheme.

Another aspect of the present disclosure is to propose an apparatus and method for transmitting a D2D discovery message based on a type of a D2D discovery message which will be transmitted by a serving cell which does not support a D2D discovery process in a communication system supporting a D2D scheme.

In accordance with an aspect of the present disclosure, a method for transmitting a discovery message in a communication system is provided. The method includes detecting a need for transmitting a discovery message in a serving cell in which a direct discovery process is unsupportable; detecting a cell other than the serving cell; and transmitting the discovery message based on system information if the system information is broadcasted in the cell.

In accordance with another aspect of the present disclosure, a method for transmitting a discovery message in a communication system is provided. The method includes detecting a need for transmitting a discovery message in a serving cell in which a direct discovery process is unsupportable; performing a first cell detecting process for detecting a cell other than the serving cell; performing a second cell detecting process if the cell is not detected based on the first cell detecting process; reselecting a cell detected based on the second cell detecting process as a serving cell if the cell is detected based on the second cell detecting process; and transmitting the discovery message through the reselected serving cell.

In accordance with another aspect of the present disclosure, a user equipment (UE) in a communication system is provided. The UE includes a processor configured to detect a need for transmitting a discovery message in a serving cell in which a direct discovery process is unsupportable, to detect a cell other than the serving cell, and to transmit the discovery message based on system information if the system information is broadcasted in the cell.

In accordance with another aspect of the present disclosure, a user equipment (UE) in a communication system is provided. The UE includes a processor configured to detect a need for transmitting a discovery message in a serving cell in which a direct discovery process is unsupportable, to perform a first cell detecting process for detecting a cell other than the serving cell, to perform a second cell detecting process if the cell is not detected based on the first cell detecting process, to reselect a cell detected based on the second cell detecting process as a serving cell if the cell is detected based on the second cell detecting process, and to transmit the discovery message through the reselected serving cell.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 1 schematically illustrates an example of a process for transmitting a D2D discovery message in a communication system supporting a D2D scheme according to an embodiment of the present disclosure;

FIG. 2 schematically illustrates another example of a process for transmitting a D2D discovery message in a communication system supporting a D2D scheme according to an embodiment of the present disclosure;

FIG. 3 schematically illustrates still another example of a process for transmitting a D2D discovery message in a communication system supporting a D2D scheme according to an embodiment of the present disclosure;

FIG. 4 schematically illustrates still another example of a process for transmitting a D2D discovery message in a communication system supporting a D2D scheme according to an embodiment of the present disclosure;

FIG. 5 schematically illustrates still another example of a process for transmitting a D2D discovery message in a communication system supporting a D2D scheme according to an embodiment of the present disclosure;

FIG. 6 schematically illustrates an example of an inner structure of a D2D UE in a communication system supporting a D2D scheme according to an embodiment of the present disclosure; and FIG. 7 schematically illustrates another example of an inner structure of a D2D UE in a communication system supporting a D2D scheme according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal receiving apparatus may be a user equipment (UE), and a signal transmitting apparatus may be a base station. The term UE may be interchangeable with the term mobile station (MS), wireless terminal, mobile device, and the like. The term base station may be interchangeable with the term node B, evolved node B (eNB), evolved universal terrestrial radio access network (E-UTRAN) node B (eNB), access point (AP), and the like.

An embodiment of the present disclosure proposes an apparatus and method for transmitting a device to device (D2D) discovery message in a communication system supporting a D2D scheme.

An embodiment of the present disclosure proposes an apparatus and method for transmitting a D2D discovery message based on system information in a communication system supporting a D2D scheme.

An embodiment of the present disclosure proposes an apparatus and method for transmitting a D2D discovery message in a serving cell which does not support a D2D discovery process in a communication system supporting a D2D scheme.

An embodiment of the present disclosure proposes an apparatus and method for transmitting a D2D discovery message based on system information in a serving cell which does not support a D2D discovery process in a communication system supporting a D2D scheme.

An embodiment of the present disclosure proposes an apparatus and method for transmitting a D2D discovery message by performing a cell reselecting process in a serving cell which does not support a D2D discovery process in a communication system supporting a D2D scheme.

An embodiment of the present disclosure proposes an apparatus and method for transmitting a D2D discovery message based on a type of a D2D discovery message which will be transmitted by a serving cell which does not support a D2D discovery process in a communication system supporting a D2D scheme.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

For convenience, a UE which supports a D2D scheme will be referred to as a D2D UE.

An example of a process for transmitting a D2D discovery message in a communication system supporting a D2D scheme according to an embodiment of the present disclosure will be described with reference to FIG. 1.

FIG. 1 schematically illustrates an example of a process for transmitting a D2D discovery message in a communication system supporting a D2D scheme according to an embodiment of the present disclosure.

Referring to FIG. 1, a D2D UE is camped on a serving cell, e.g., a specific carrier/radio frequency. The serving cell does not support a D2D direct discovery process. If the D2D UE is interested in transmitting a D2D discovery message, the D2D UE detects a cell on carriers/radio frequencies which are supported by the D2D UE. The D2D UE tunes to a carrier/radio frequency and detects a cell on the tuned carrier/radio frequency. If a cell is detected, the D2D UE determines whether to perform a reselecting process for the detected cell, and this will be described below.

In FIG. 1, it will be assumed that a detected cell other than a serving cell is a suitable cell. If a cell meets s-criteria, the cell is determined as a suitable cell. Alternatively, if a cell meets s-criteria and PLMN selection criteria, the cell is determined as a suitable cell.

The D2D UE detects a cell other than a serving cell at operation 111. The D2D UE determines whether system information, e.g., a system information block (SIB) 19 is broadcasted at the detected cell at operation 113. If the SIB 19 is not transmitted at the detected cell, the D2D UE does not reselect the detected cell at operation 115.

If the SIB 19 is transmitted at the detected cell, the D2D UE reads the SIB 19 which is broadcasted by the detected cell at operation 117. The D2D UE determines whether transmission resource information or transmission resource pool information is included in the SIB 19 at operation 119. The transmission resource information denotes information on a transmission resource used for transmitting a D2D discovery message, and the transmission resource pool information denotes information on a transmission resource pool, and includes at least one transmission resource.

If the transmission resource information is included in the SIB 19, the
D2D UE does not reselect the detected cell at operation 121. The D2D UE transmits the D2D discovery message using a transmission resource which corresponds to the transmission resource information included in the SIB 19.

If the transmission resource information is not included in the SIB 19, the D2D UE performs a cell reselecting process at operation 125. Here, the D2D UE prioritizes the detected cell, i.e., a carrier of the detected cell upon performing the cell reselecting process. The detected cell becomes a serving cell according to the cell reselecting process. The D2D UE requests a resource for transmitting the D2D discovery message from the reselected cell, and transmits the D2D discovery message using a resource allocated from the reselected cell according to the request at operation 127.

An example of a process for transmitting a D2D discovery message in a communication system supporting a D2D scheme according to an embodiment of the present disclosure has been described with reference to FIG. 1, and another example of a process for transmitting a D2D discovery message in a communication system supporting a D2D scheme according to an embodiment of the present disclosure will be described with reference to FIG. 2.

FIG. 2 schematically illustrates another example of a process for transmitting a D2D discovery message in a communication system supporting a D2D scheme according to an embodiment of the present disclosure.

Referring to FIG. 2, a D2D UE is camped on a serving cell, e.g., a specific carrier/radio frequency. The serving cell does not support a D2D direct discovery process. If the D2D UE is interested in transmitting a D2D discovery message, the D2D UE detects a cell on carriers/radio frequencies which are supported by the D2D UE. The D2D UE tunes to a carrier/radio frequency and detects a cell on the tuned carrier/radio frequency. If a cell is detected, the D2D UE determines whether to perform a reselecting process for the detected cell, and this will be described below.

In FIG. 2, it will be assumed that a detected cell other than a serving cell is a suitable cell. If a cell meets s-criteria, the cell is determined as a suitable cell. Alternatively, if a cell meets s-criteria and PLMN selection criteria, the cell is determined as a suitable cell.

Further, operations 211 to 217 in FIG. 2 are identical to operations 111 to 117 in FIG. 1, so a description thereof will be omitted herein.

Meanwhile, a D2D UE determines whether reception resource information as information on a reception resource used for receiving a D2D discovery message is included in the SIB 19 and transmission resource information as information on a transmission resource used for transmitting a D2D discovery message is not included in the SIB 19 at operation 219. If the transmission resource information is included in the SIB 19, the D2D UE proceeds to operation 221.

The D2D UE does not reselect the detected cell at operation 221. The D2D UE transmits the D2D discovery message using a transmission resource which corresponds to the transmission resource information included in the SIB 19 at operation 223.

If the reception resource information is included in the SIB 19 and the transmission resource information is not included in the SIB 19, the D2D UE proceeds to operation 225. The D2D UE performs a cell reselecting process at operation 225. Here, the D2D UE prioritizes the detected cell, i.e., a carrier of the detected cell upon performing the cell reselecting process, and proceeds to operation 227. The detected cell becomes a serving cell according to the cell reselecting process. The D2D UE requests a resource for transmitting the D2D discovery message from the reselected cell, and transmits the D2D discovery message using a resource allocated from the reselected cell according to the request at operation 227.

Another example of a process for transmitting a D2D discovery message in a communication system supporting a D2D scheme according to an embodiment of the present disclosure has been described with reference to FIG. 2, and still another example of a process for transmitting a D2D discovery message in a communication system supporting a D2D scheme according to an embodiment of the present disclosure will be described with reference to FIG. 3.

FIG. 3 schematically illustrates still another example of a process for transmitting a D2D discovery message in a communication system supporting a D2D scheme according to an embodiment of the present disclosure.

Referring to FIG. 3, a D2D UE is camped on a serving cell, e.g., a specific carrier/radio frequency. The serving cell does not support a D2D direct discovery process. If the D2D UE is interested in transmitting a D2D discovery message, the D2D UE detects a cell on carriers/radio frequencies which are supported by the D2D UE. The D2D UE tunes to a carrier/radio frequency and detects a cell on the tuned carrier/radio frequency.

A D2D UE performs a cell detecting process for detecting a suitable cell at operation 311. The D2D UE may detect the suitable cell based on the following criteria. That is, if a corresponding cell satisfies the following criteria, the corresponding cell is the suitable cell.

(A) A cell meets S-criteria. Alternatively, a cell may meet S-criteria and PLMN selection criteria.

(B) An SIB 19 is broadcasted at a cell.

(C) An SIB 19 includes transmission resource information or transmission resource pool information. The transmission resource pool information denotes information on a transmission resource pool used for transmitting a D2D discovery message, and the transmission resource pool denotes a pool including at least one transmission resource used for transmitting a D2D discovery message.

The D2D UE determines whether a suitable cell is detected according the cell detecting process at operation 313. If the suitable cell is detected, the D2D UE determines not to perform a cell reselecting process for the detected cell at operation 315. The D2D UE transmits a D2D discovery message using a transmission resource which corresponds to transmission resource information or transmission resource pool information included in an SIB 19 which is broadcasted at the detected cell at operation 317.

If the suitable cell is not detected, that is, if the suitable cell is not detected on a carrier on which an SIB including transmission resource information or transmission resource pool information is broadcasted, the D2D UE performs the cell detecting process for detecting a suitable cell again at operation 319. The D2D UE may detect the suitable cell based on the following criteria. That is, if a corresponding cell meets the following criteria, the corresponding cell is the suitable cell.

(A) A cell meets S-criteria. Alternatively, a cell may meet S-criteria and PLMN selection criteria.

(B) An SIB 19 is broadcasted at a cell.

(C) An SIB 19 does not include transmission resource information or transmission resource pool information.

The D2D UE determines whether a suitable cell is detected according the cell detecting process at operation 321. If the suitable cell is detected, the D2D UE performs a cell reselecting process for the detected cell at operation 323. The D2D UE requests a resource for transmitting the D2D discovery message from the reselected cell, and transmits the D2D discovery message using a resource which is allocated from the reselected cell according to the request at operation 323.

In a case that an SIB which does not include transmission resource information or transmission resource pool information is broadcasted at a detected cell, still another example of a process for transmitting a D2D discovery message in a communication system supporting a D2D scheme according to an embodiment of the present disclosure illustrated in FIG. 3 priorities a carrier of the detected cell for reselecting the cell in which the SIB which does not include the transmission resource information or the transmission resource pool information is broadcasted unless another cell in which an SIB including transmission resource information or transmission resource pool information is broadcasted.

Still another example of a process for transmitting a D2D discovery message in a communication system supporting a D2D scheme according to an embodiment of the present disclosure has been described with reference to FIG. 3, and still another example of a process for transmitting a D2D discovery message in a communication system supporting a D2D scheme according to an embodiment of the present disclosure will be described with reference to FIG. 4.

FIG. 4 schematically illustrates still another example of a process for transmitting a D2D discovery message in a communication system supporting a D2D scheme according to an embodiment of the present disclosure.

Referring to FIG. 4, a D2D UE is camped on a serving cell, e.g., a specific carrier/radio frequency. The serving cell does not support a D2D direct discovery process. If the D2D UE is interested in transmitting a D2D discovery message, the D2D UE detects a cell on carriers/radio frequencies which are supported by the D2D UE. The D2D UE tunes to a carrier/radio frequency and detects a cell on the tuned carrier/radio frequency.

Further, operations 411 to 417 in FIG. 4 are identical to operations 311 to 317 in FIG. 3, so a description thereof will be omitted herein.

If a suitable cell is not detected, that is, if the suitable cell is not detected on a carrier in which an SIB including transmission resource information or transmission resource pool information is broadcasted at operation 413, the D2D UE performs a cell detecting process for detecting a suitable cell again at operation 419. The D2D UE may detect the suitable cell based on the following criteria. That is, if a corresponding cell meets the following criteria, the corresponding cell is the suitable cell.

(A) A cell meets S-criteria. Alternatively, a cell may meet S-criteria and PLMN selection criteria.

(B) An SIB 19 is broadcasted at a cell.

(C) An SIB 19 does not include transmission resource information or transmission resource pool information, and includes reception resource information or reception resource pool information. The reception resource information denotes information for a reception resource, and the reception resource pool includes at least one reception resource.

The D2D UE determines whether the suitable cell is detected according the cell detecting process at operation 421. If the suitable cell is detected, the D2D UE performs a cell reselecting process for the detected cell at operation 423. The D2D UE requests a resource for transmitting a D2D discovery message from the reselected cell, and transmits the D2D discovery message using a resource which is allocated from the reselected cell according to the request at operation 423.

In a case that an SIB which does not include transmission resource information or transmission resource pool information is broadcasted at a detected cell, still another example of a process for transmitting a D2D discovery message in a communication system supporting a D2D scheme according to an embodiment of the present disclosure illustrated in FIG. 4 priorities a carrier of the detected cell for reselecting the cell in which the SIB which does not include the transmission resource information or the transmission resource pool information is broadcasted unless another cell in which an SIB including transmission resource information or transmission resource pool information is broadcasted.

Still another example of a process for transmitting a D2D discovery message in a communication system supporting a D2D scheme according to an embodiment of the present disclosure has been described with reference to FIG. 4, and still another example of a process for transmitting a D2D discovery message in a communication system supporting a D2D scheme according to an embodiment of the present disclosure will be described with reference to FIG. 5.

FIG. 5 schematically illustrates still another example of a process for transmitting a D2D discovery message in a communication system supporting a D2D scheme according to an embodiment of the present disclosure.

Referring to FIG. 5, a D2D UE is camped on a serving cell, e.g., a specific carrier/radio frequency. The serving cell does not support a D2D direct discovery process.

A D2D UE detects a need for transmitting a D2D discovery message at operation 511. The D2D UE determines a type of a D2D discovery message to be transmitted at operation 513. The D2D UE determines whether the type of the D2D discovery message to be transmitted is a public safety (PS) discovery type at operation 515. If the type of the D2D discovery message to be transmitted is the PS discovery type, the D2D UE determines to prioritize a specific carrier, i.e., a PS carrier for cell reselection and performs a cell detecting process for detecting a cell which supports a D2D direct discovery process on the PS carrier at operation 517. The D2D UE determines whether a cell is detected according to the cell detecting process at operation 519. If the cell is detected, the D2D UE performs a cell reselecting process for the detected cell at operation 521. Here, operations 519 and 521 may be omitted.

The cell reselecting process may be performed based on one of the following two options, i.e., an option 1 and an option 2, and each of the option 1 and the option 2 will be described below.

Firstly, the option 1 will be described below.

In the option 1, if the detected cell broadcasts an SIB 19 including transmission resource information or transmission resource pool information for transmitting a D2D discovery message, the D2D UE does not reselect the detected cell and transmits the D2D discovery message using a transmission resource which corresponds to the transmission resource information or the transmission resource pool information included in the SIB 19.

Alternatively, if the detected cell broadcasts an SIB 19 and the SIB 19 does not include transmission resource information or transmission resource pool information for transmitting a D2D discovery message, the D2D UE does not reselect the detected cell and detects another cell again.

Secondly, the option 2 will be described below.

The option 2 denotes that a process for reselecting a cell as described in FIGS. 1 to 4 is performed, so a description of the option 2 will be omitted herein.

If the type of the D2D discovery message to be transmitted is not the PS discovery type, that is, if the type of the D2D discovery message to be transmitted is a non PS type, the D2D UE proceeds at operation 523. The D2D UE determines not to prioritize a specific carrier, i.e., a PS carrier for cell reselection and performs a cell detecting process for a cell which supports a D2D direct discovery process at operation 523. The D2D UE determines whether a cell is detected according to the cell detecting process at operation 525. If the cell is detected, the D2D UE performs a cell reselecting process for the detected cell at operation 527. Here, operations 525 and 527 may be omitted. The cell reselecting process may be performed based on one of the option 1 and the option 2, and the option 1 and the option 2 have been described at operation 521, so a description thereof will be omitted herein.

Meanwhile, a process described in each of FIGS. 1 to 5 is just an example, various changes could be made to each of FIGS. 1 to 5. For example, although shown as a series of operations, various operations in each of FIGS. 1 to 5 could overlap, occur in parallel, occur in a different order, or occur multiple times.

Still another example of a process for transmitting a D2D discovery message in a communication system supporting a D2D scheme according to an embodiment of the present disclosure has been described with reference to FIG. 5, and an example of an inner structure of a D2D UE in a communication system supporting a D2D scheme according to an embodiment of the present disclosure will be described with reference to FIG. 6.

FIG. 6 schematically illustrates an example of an inner structure of a D2D UE in a communication system supporting a D2D scheme according to an embodiment of the present disclosure.

Referring to FIG. 6, a D2D UE 600 may be connected with an external electronic device (not illustrated in FIG. 6) using at least one of a communication module, a connector, and an earphone connecting jack. The electronic device may include one of various devices which are removable from the D2D UE 600 and are connectible with the D2D UE 600 in a wired manner, such as, for example, an earphone, an external speaker, a universal serial bus (USB) memory, a charging device, a cradle/dock, a digital multimedia broadcasting (DMB) antenna, a mobile payment-related device, a health management device (a blood pressure monitor or the like), a game console, a vehicle navigation device, and so forth.

The external electronic device may be one of a wirelessly connectible Bluetooth communication device, a near field communication (NFC) device, a WiFi Direct communication device, a wireless access point (AP), etc. The D2D UE 600 may be connected with a server or another communication device such as, for example, one of a cellular phone, a smart phone, a tablet PC, a desktop PC, and a server, in a wired or wireless manner.

The D2D UE 600 includes a camera processor 611, an image processor 613, a display 615, a controller 617, a radio frequency (RF) processor 619, a data processor 621, a memory 623, an audio processor 625, and a key input unit 627.

The RF processor 619 is responsible for radio communication of the D2D UE 600. The RF processor 619 includes a RF transmitter for frequency up-converting transmission signals and amplifying the up-converted signals, and a RF receiver for low-noise-amplifying received signals and frequency down-converting the amplified signals.

The data processor 621 includes a transmitter for encoding and modulating the transmission signals, and a receiver for demodulating and decoding the received signals. In other words, the data processor 621 may include a modulator/demodulator (MODEM) and a coder/decoder (CODEC). The CODEC includes a data CODEC for processing packet data, and an audio CODEC for processing audio signals such as voice.

The audio processor 625 plays received audio signals output from the audio CODEC in the data processor 621 using a speaker, and transfers transmission audio signals picked up by a microphone to the audio CODEC in the data processor 621.

The key input unit 627 includes numeric/character keys for inputting numeric and character information and function keys for setting various functions.

A memory 623 may include a program memory, a data memory, and the like. The program memory may store programs for controlling the general operation of the D2D UE 600. In accordance with an embodiment to the present invention, the memory 623 may store programs related to an operation of transmitting a D2D discovery message in a communication system supporting a D2D scheme. The data memory may temporarily store the data generated during execution of these programs.

The memory 623 may be implemented as an arbitrary data storing device such as a read only memory (ROM), a random access memory (RAM), and a memory card (for example, a secure digital (SD) card, and a memory stick). The memory 623 may include a non-volatile memory, a volatile memory, a hard disk drive (HDD), or a solid state drive (SSD).

The memory 623 may also store applications of various functions such as navigation, video communication, games, an alarm application based on time, images for providing a graphic user interface (GUI) related to the applications, user information, documents, databases or data related to a method for processing touch inputs, background images (for example, a menu screen, a standby screen, and so forth), operation programs necessary for driving the D2D UE 600, and images captured by the camera processor 611.

The memory 623 is a media which is red though a machine, e.g., a computer. Here, the term "machine-readable medium" includes a medium for providing data to the machine to allow the machine to execute a particular function. The memory 623 may include non-volatile media and volatile media. Such a medium needs to be of a tangible type so that commands delivered to the medium can be detected by a physical tool which reads the commands with the machine.

The machine-readable medium may include, but is not limited to, at least one of a floppy disk, a flexible disk, a hard disk, a magnetic tape, a compact disc read-only memory (CD-ROM), an optical disk, a punch card, a paper tape, a RAM, a programmable read-only memory (PROM), an erasable programmable read-only memory (EPROM), and a flash-EPROM.

The controller 617 controls the overall operation of the D2D UE 600. The controller 617 performs an operation related to an operation of transmitting a D2D discovery message in a communication system supporting a D2D scheme according to an embodiment of the present invention. The operation related to the operation of transmitting the D2D discovery message in the communication system supporting the D2D scheme according to an embodiment of the present invention is performed in the manner described before with reference to FIGS. 1 to 5, so a detailed description thereof will be omitted herein.

A camera processor 611 includes a camera sensor for capturing images and converting the captured optical image signal into an electrical signal, and a signal processor for converting the analog image signal captured by the camera sensor into digital data. The camera sensor may be assumed to be a charge-coupled device (CCD) or complementary metal-oxide-semiconductor (CMOS) sensor, and the signal processor may be implemented with a digital signal processor (DSP). The camera sensor and the signal processor may be implemented either in an integrated way, or in a separated way.

The image processor 613 performs image signal processing (ISP) for displaying the image signals output from the camera processor 611 on the display 615. The ISP may include gamma correction, interpolation, spatial variations, image effects, image scaling, automatic white balance (AWB), automatic exposure (AE), and automatic focus (AF). The image processor 613 processes the image signals output from the camera processor 611 on a frame-by-frame basis, and outputs the frame image data according to the characteristics and size of the display 615.

The image processor 613 includes a video codec, which compresses the frame image data displayed on the display 615 by a preset coding scheme, and decompresses the compressed frame image data into the original frame image data. The video codec may include a joint photographic experts group (JPEG) codec, a moving picture experts group 4 (MPEG4) codec, and a Wavelet codec. The image processor 613 is assumed to have an on-screen display (OSD) function, and may output OSD data according to the size of the displayed screen, under control of the controller 617.

The display 615 displays, on its screen, image signals output from the image processor 613 and user data output from the controller 617. The display 615 may include a liquid crystal display (LCD). In this case, the display 615 may include an LCD controller, a memory capable of storing image data, and an LCD panel. When implemented in a touch screen manner, the LCD may serve as an input unit. In this case, the same keys as those on the key input unit 627 may be displayed on the display 615.

If the display 615 is implemented as the touch screen, the display 615 outputs an analog signal, which corresponds to at least one input to a user graphic interface, to the controller 617.

The display 615 receives at least one user inputs through a user's body (for example, a finger including a thumb) or the key input unit 627 (for example, a stylus pen or an electronic pen).

The display 615 receives continuous motions on one touch (for example, a drag). The display 615 outputs an analog signal corresponding to the continuous motions to the controller 617.

In an embodiment of the present invention, a touch may also include a non-contact touch (for example, when the user input means is positioned within a distance of, for example, 1 cm) in which the user input means may be detected without a direct contact with the display 615. The touch may also include a direct contact between the display 615 and a finger or the key input unit 627. A distance or interval from the display 615 within which the user input means may be detected may be changed according to the capability or structure of the D2D UE 600. In particular, to separately detect a direct touch event based on a contact with the user input means and an indirect touch event (that is, a hovering event), the display 615 may be configured to output different values for values (for example, an analog voltage value or current value) detected in the direct touch event and the hovering event.

The display 615 may be implemented as, for example, a resistive type, a capacitive type, an infrared type, an acoustic wave type, or a combination thereof.

The display 615 may include at least two touch panels capable of sensing a touch, an approach of a finger, or the key input unit 627 to receive inputs generated by the finger or the key input unit 627. The at least two touch panels provide different output values to the controller 617. Thus, the controller 617 differently recognizes the values input from the at least two touch screen panels to identify whether the input from the display 615 is the input generated by the finger or by the key input unit 627.

The controller 617 converts the analog signal received from the display 615 into a digital signal and controls the display 615 using the digital signal. For example, the controller 617 may control a shortcut icon (not illustrated in FIG. 6) displayed on the display 615 to be selected or executed in response to a direct touch event or a hovering event.

The controller 617, by detecting a value (for example, an electric-current value) output through the display 615, recognizes a hovering interval or distance as well as a user input position and converts the recognized distance into a digital signal (for example, a Z coordinate). The controller 617 may also, by detecting the value output through the display 615, detect a pressure applied by the user input means to the display 615, and convert the detected pressure into a digital signal.

While the camera processor 611, the image processor 613, the display 615, the controller 617, the RF processor 619, the data processor 621, the memory 623, the audio processor 625, and the key input unit 627 are shown in FIG. 6 as separate units, it is to be understood that this is for merely convenience of description. In other words, two or more of the camera processor 611, the image processor 613, the display 615, the controller 617, the RF processor 619, the data processor 621, the memory 623, the audio processor 625, and the key input unit 627 may be incorporated into a single unit.

Alternatively, the D2D UE 600 may be implemented with one processor.

An example of an inner structure of a D2D UE in a communication system supporting a D2D scheme according to an embodiment of the present disclosure has been described with reference to FIG. 6, and another example of an inner structure of a D2D UE in a communication system supporting a D2D scheme according to an embodiment of the present disclosure will be described with reference to FIG. 7.

FIG. 7 schematically illustrates another example of an inner structure of a D2D UE in a communication system supporting a D2D scheme according to an embodiment of the present disclosure.

Referring to FIG. 7, a D2D UE 700 includes a transmitter 711, a controller 713, a receiver 715, and a storage unit 717.

The controller 713 controls the overall operation of the D2D UE 700. More particularly, the controller 713 controls the D2D UE 700 to perform an operation related to an operation of transmitting a D2D discovery message in a communication system supporting a D2D scheme according to an embodiment of the present disclosure. The operation related to the operation of transmitting the D2D discovery message in the communication system supporting the D2D scheme according to an embodiment of the present disclosure is performed in the manner described with reference to FIGS. 1 to 5, and a description thereof will be omitted herein.

The transmitter 711 transmits various signals and various messages, and the like to other devices, e.g., another D2D UE, a base station, and the like included in the communication system under a control of the controller 713. The various signals, the various messages, and the like transmitted in the transmitter 711 have been described in FIGS. 1 to 5 and a description thereof will be omitted herein.

The receiver 715 receives various signals, various messages, and the like from other devices, e.g., another D2D UE, a base station, and the like included in the communication system under a control of the controller 713. The various signals, the various messages, and the like received in the receiver 715 have been described in FIGS. 1 to 5 and a description thereof will be omitted herein.

The storage unit 717 stores a program related to an operation of transmitting a D2D discovery message in a communication system supporting a D2D scheme according to an embodiment of the present disclosure which the D2D UE 700 performs under a control of the controller 713, various data, and the like.

The storage unit 717 stores the various signals and the various messages which the receiver 715 receives from the other devices, and the like.

While the transmitter 711, the controller 713, the receiver 715, and the storage unit 717 are described in the D2D UE 700 as separate units, it is to be understood that this is merely for convenience of description. In other words, two or more of the transmitter 711, the controller 713, the receiver 715, and the storage unit 717 may be incorporated into a single unit.

The D2D UE 700 may be implemented with one processor.

As is apparent from the foregoing description, an embodiment of the present disclosure enables to transmit a D2D discovery message in a communication system supporting a D2D scheme.

An embodiment of the present disclosure enables to transmit a D2D discovery message based on system information in a communication system supporting a D2D scheme.

An embodiment of the present disclosure enables to transmit a D2D discovery message in a serving cell which does not support a D2D discovery process in a communication system supporting a D2D scheme.

An embodiment of the present disclosure enables to transmit a D2D discovery message based on system information in a serving cell which does not support a D2D discovery process in a communication system supporting a D2D scheme.

An embodiment of the present disclosure enables to transmit a D2D discovery message by performing a cell reselecting process in a serving cell which does not support a D2D discovery process in a communication system supporting a D2D scheme.

An embodiment of the present disclosure enables to transmit a D2D discovery message based on a type of a D2D discovery message which will be transmitted by a serving cell which does not support a D2D discovery process in a communication system supporting a D2D scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting a discovery message by a terminal in a communication system, the method comprising:
    identifying that a discovery process used for discovery message transmission is unsupportable in a first cell which is a serving cell for the terminal;
    identifying a second cell other than the first cell;
    receiving system information from the second cell;
    identifying that the second cell is configured to support the discovery process based on the system information;
    identifying whether transmission pool information or reception pool information is included in the system information;
    in case the system information includes the transmission pool information, transmitting a first discovery message using a transmission resource based on the system information, and
    in case the system information includes the reception pool information, receiving a second discovery message using a reception resource based on the system information,
    wherein the second cell satisfies S-criteria and PLMN selection criteria related to cell selection,
    wherein the transmission pool information indicates at least one transmission resource by which the terminal is allowed to transmit the first discovery message, and
    wherein the reception pool information indicates at least one reception resource by which the terminal is allowed to receive the second discovery message.

2. The method of claim 1, further comprising:
    initiating a reselection procedure to the second cell in response to identifying that the system information does not include the transmission pool information;
    transmitting, to the second cell, a request to allocate the transmission resource; and
    receiving, from the second cell, information about the transmission resource allocated by the second cell to the terminal.

3. The method of claim 1, wherein transmitting the discovery message using the transmission resource comprises transmitting the first discovery message using the transmission resource based on the transmission pool information in response to identifying that the system information includes the reception pool information, and that the system information does not include the transmission pool information.

4. The method of claim 1, further comprising:
initiating a reselection process to the second cell in response to identifying that the system information does not include the reception pool information, and the transmission pool information;
transmitting, to the second cell, a request to allocate the transmission resource; and
receiving, from the second cell, information about the transmission resource allocated by the second cell to the terminal.

5. A terminal in a communication system comprising:
at least one processor configured to:
identify that a discovery process used for discovery message transmission is unsupportable in a first cell which is a serving cell for the terminal,
identify a second cell other than the first cell,
identify that the second cell is configured to support the discovery process based on system information received from the second cell,
identify whether transmission pool information or reception pool information is included in the system information; and
a transceiver configured to:
receive the system information from the second cell,
in case the system information includes the transmission pool information, transmit a first discovery message using a transmission resource based on the system information, and
in case the system information includes the reception pool information, receive a second discovery message using a reception resource based on the system information,
wherein the second cell satisfies S-criteria and PLMN selection criteria related to cell selection,
wherein the transmission pool information indicates at least one transmission resource by which the terminal is allowed to transmit the first discovery message, and
wherein the reception pool information indicates at least one reception resource by which the terminal is allowed to receive the second discovery message.

6. The terminal of claim 5,
wherein the at least one processor is further configured to:
initiate a reselection procedure to the second cell in response to identifying that the system information does not include the transmission pool information, and
wherein the transceiver is further configured to:
transmit, to the second cell, a request to allocate the transmission resource, and
receive, from the second cell, information about the transmission resource allocated by the second cell to the terminal.

7. The terminal of claim 5, wherein the transceiver is configured to transmit the first discovery message using the transmission resource based on the transmission pool information in response to identifying that the system information includes the reception pool information, and that the system information does not include the transmission pool information.

8. The terminal of claim 5,
wherein the at least one processor is further configured to:
initiate a reselection process to the second cell in response to identifying that the system information does not include the reception pool information, and the transmission pool information, and wherein the transceiver is further configured to:
transmit, to the second cell, a request to allocate the transmission resource, and
receive, from the second cell, information about the transmission resource allocated by the second cell to the terminal.

9. A method for transmitting a discovery message in a terminal in a communication system, comprising:
identifying that a discovery process used for discovery message transmission is unsupportable in a serving cell;
identifying a cell other than the serving cell;
receiving, from the cell, system information including transmission pool information of the cell; and
transmitting the discovery message based on the transmission pool information included in the system information received from the cell,
wherein the cell satisfies S-criteria and PLMN selection criteria related to cell selection, and
wherein the transmission pool information indicates at least one transmission resource by which the terminal is allowed to transmit the discovery message.

10. The method of claim 9, wherein transmitting the discovery message based on the transmission pool information comprises:
transmitting the discovery message by the at least one transmission resource.

11. A terminal in a communication system, comprising:
at least one processor configured to:
identify that a discovery process used for discovery message transmission is unsupportable in a serving cell, and
identify a cell other than the serving cell;
a receiver configured to receive, from the cell, system information including transmission pool information; and
a transmitter configured to transmit the discovery message based on the transmission pool information included in the system information received from the cell,
wherein the cell satisfies S-criteria and PLMN selection criteria related to cell selection, and
wherein the transmission pool information indicates at least one transmission resource by which the terminal is allowed to transmit the discovery message.

12. The terminal of claim 11, wherein the transmitter is configured to transmit the discovery message by the at least one transmission resource.

* * * * *